Oct. 17, 1933.　　　　　F. H. MANTER　　　　1,930,527
SUGAR FREE CONFECTION AND PROCESS OF MAKING THE SAME
Filed Nov. 6, 1931
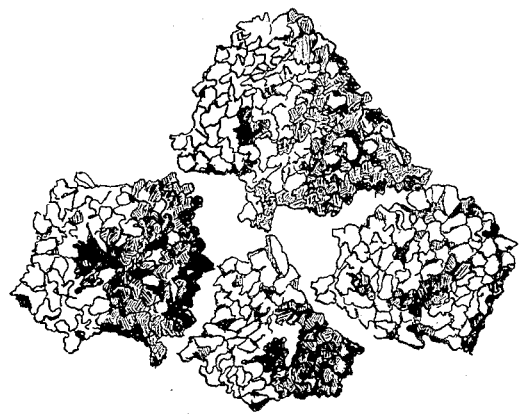
INVENTOR
Franklin H. Manter
BY HIS ATTORNEYS
Newell & Spencer Patented Oct. 17, 1933

1,930,527

UNITED STATES PATENT OFFICE 1,930,527

SUGAR-FREE CONFECTION AND PROCESS OF MAKING THE SAME

Franklin H. Manter, New York, N. Y., assignor to Lister Bros., Inc., New York, N. Y., a corporation of New York Application November 6, 1931. Serial No. 573,440

10 Claims. (Cl. 99—11)

This invention relates to a sugar-free confection for diabetics and others requiring a diet restricted as to the amount of sugar, and to a process of making such a confection.

The sugar-free confections heretofore manufactured ordinarily have been made by forming a water solution of water-soluble gums containing a sweetening agent and other flavoring material, and a coloring dye if desired. The gums are secured by the manufacturer in powdered or pulverized form. The powder is dissolved in a water solution containing the flavoring material and coloring matter. During the dissolving operation the material is heated or cooked to hasten the dissolving of the gums and to insure the formation of a complete solution. After the gums have been dissolved, the solution is placed in trays and the water is evaporated preferably by the application of heat, leaving the gums with the flavoring material mixed therewith in the bottoms of the trays. The gums form solid sheets in the trays, and these sheets are broken up into relatively small pieces and the confection is sold in this broken-up form. Sometimes the trays comprise a number of relatively small moulds in which the gums are left at the bottoms of the trays after the evaporation of the water. The confections thus manufactured have a dull and unattractive appearance and do not closely resemble any kind of candy. A confection made in this manner has a tendency to absorb moisture from the air, and often is transformed into a relatively soft plastic or semi-fluid mass. When pieces of the confection are placed in a box or other container, the soft plastic masses formed by absorption of water often adhere to each other or spread over the bottom of the container and are very unattractive in appearance. In dry atmospheric conditions such confections dry out and become very friable and crumbly which is also undesirable.

The primary objects of the present invention are to improve the character of sugar-free confections and to produce a sugar-free confection which has the attractive appearance of certain kinds of candy and which will retain its original condition for a relatively long period.

Another object of the invention is to produce a sugar-free confection which resembles in appearance and in brittleness certain kinds of hard candy.

With the above and other objects in view, the invention comprises the confection and process of making the same respectively embodying and containing the novel and improved features hereinafter described and particularly pointed out in the claims, the advantages of which will be readily understood and appreciated by those skilled in the art.

The invention will be clearly understood from the accompanying drawing illustrating a confection embodying the invention and the following detailed description of the confection and the process of making the same.

In the drawing the figure illustrates, in elevation, several masses of a sugar-free confection embodying certain features of the present invention.

In manufacturing a sugar-free confection in accordance with the present invention, the inventor employs certain water-soluble gums in granules as distinguished from the powdered form. The gums exude from the incisions made in the trees or shrubs from which they are derived in relatively large drop-like masses called "tears". These "tears" are broken up into granules of any desired size. With the gum granules may be combined if desired, a relatively small quantity of gums in powdered form. A water solution is formed of the flavoring material to be applied to the gums and this solution is applied in the form of a spray or mist to the gum granules. In order to effect the best results the amount by weight of the gums to be treated is accurately measured and a certain definite proportion by weight of the flavoring solution is applied to the measured quantity of the gums. When it is desired to give the product a certain definite coloring, dye or other coloring matter is placed in the flavoring solution which is applied to the granules of gum.

During the application of the flavoring liquid to the gum granules, these granules are agitated so that the spray is applied to all sides of each granule. The granules may be agitated in a tumbling barrel during the spraying operation, or the granules may be agitated in any other suitable manner to effect this result.

Since the gums are readily soluble in water, when the water solution of the flavoring material strikes the surfaces of the granules of gum, a thin film of gum solution is formed on the surface of each granule and the flavoring solution also penetrates to the center of each granule without dissolving the same. The gum solution on the surfaces of the granules renders the same adherent, and the solution penetrating to the center of each granule flavors the entire granule and also colors the same if coloring matter has been added. When the particles of the spray of flavoring solution strike the grains of powdered gums a solution, or partial solution, of these grains is formed which acts as a binder for the gum granules.

After the application of the flavoring solution to the granules of gum in the manner described, the granules are discharged into trays and are preferably spread in relatively thin layers upon the bottoms of the trays. The treated materials are then dried by heated air, preferably heated to a temperature of between 180° and 190° F. On account of the adherence of the gum granules when the liquid of the flavoring solution has been evaporated, the treated granules will form a layer in the bottom of each tray, having a very irregular upper surface formed by the adhering granules or masses projecting irregularly from the body of the layer. The surfaces of the irregularly-projecting masses have a high lustre and present an attractive crystalline appearance resembling rock candy. The sheets are removed from the trays and are broken up into pieces of convenient size for eating, as shown in the drawing. These pieces are packed in boxes or other containers for shipment to the buyer.

In actual practice applicant has manufactured a sugar-free confection in accordance with the present invention by employing the following water-soluble gums in the following proportions:

| | |
|---|---|
| Gum acacia | 6¼ lbs. |
| Gum ceretonia | ½ lb. |
| Gum tragacanth | ¼ lb. |

The gum acacia and preferably also the gum tragacanth are in granular form while the gum ceretonia may be in the form of a powder. Thus by far the greater proportion of the gums is in granular form with a relatively small quantity of powdered gums to form a binder. The gums in these forms are thoroughly mixed together in the above proportions and are then sprayed with 20 ounces of water solution containing the flavoring substance and the coloring material if desired. This proportion of water solution is sufficiently restricted to prevent the granules from going into solution. The gum materials, after being sprayed with the flavoring solution, are dried in trays to form layers which are broken up into relatively small pieces in the manner above described.

In the case of a confection manufactured in the manner described, the pieces have the bright sparkling attractive appearance of rock candy, and also have the brittle quality of such candy. The pieces will not absorb water readily, and will retain their bright attractive appearance and brittle quality for a long period of time.

The present confection not only has a much more attractive appearance than the ordinary sugar-free confection of similar character heretofore produced, but it may be manufactured at a considerable saving in cost as compared with prior confections of this general character. The present process eliminates the pulverizing of the gums to form a powder and also the forming of a complete solution of the gums in which heat is ordinarily applied to the materials as stated above. In the present process the amount of heat required in evaporating the water from the treated granules is very considerably less than that required in the ordinary process in evaporating the water from the complete solution.

It is to be understood that various gums may be employed in the manufacture of the present confection and that the proportions of the gums and of the flavoring solution may be varied as desired to produce the required results.

It is also to be understood that the invention is not limited to the particular product or to the process of making the same specifically described in this application, but that the invention may be embodied in other forms and applied in other ways within the scope of the claims.

Having explained the nature and object of the invention, and having particularly described one form of the product and the process of making the same, what is claimed is:

1. A process of making a sugar-free confection which comprises spraying granules of water soluble gum with a flavoring solvent.

2. The process of making a sugar-free confection which comprises applying to the surfaces only of granules of water soluble gum, a flavoring substance in aqueous liquid form.

3. The process of making a sugar-free confection which comprises applying to the surfaces only of granules of gum, a flavoring solvent so that a solution is formed on the surfaces of the granules.

4. The process of making a sugar-free confection which comprises applying a flavoring substance in aqueous liquid form to the surfaces of granules of water soluble gum in such a quantity as to prevent the granules from going into solution.

5. The process of making a sugar-free confection which comprises spraying the granules of water soluble gum with a flavoring aqueous liquid while relatively moving the granules and the spray to subject all sides of the granules to the spray and drying the sprayed granules.

6. The process of making a sugar-free confection which comprises the spraying of pieces of water soluble gum with a flavoring liquid which dissolves the surface portions of the granule pieces.

7. The process of making a sugar-free confection which comprises the spraying of water soluble gum with a flavoring liquid which dissolves the surface portions of the granules, and drying the granules in contact to form a coherent mass.

8. A sugar-free confection consisting of adhering granules of water soluble gum provided with surfaces of high lustre and having flavoring material distributed throughout the mass of each granule.

9. A sugar-free confection comprising masses of water soluble gum each having on one face thereof irregularly projecting portions provided with surfaces of high lustre.

10. A sugar-free confection comprising masses formed of adhering granules of water soluble gum and impregnated with flavoring material and each having irregularly projecting portions with surfaces of high lustre.

FRANKLIN H. MANTER.